Figure 1:
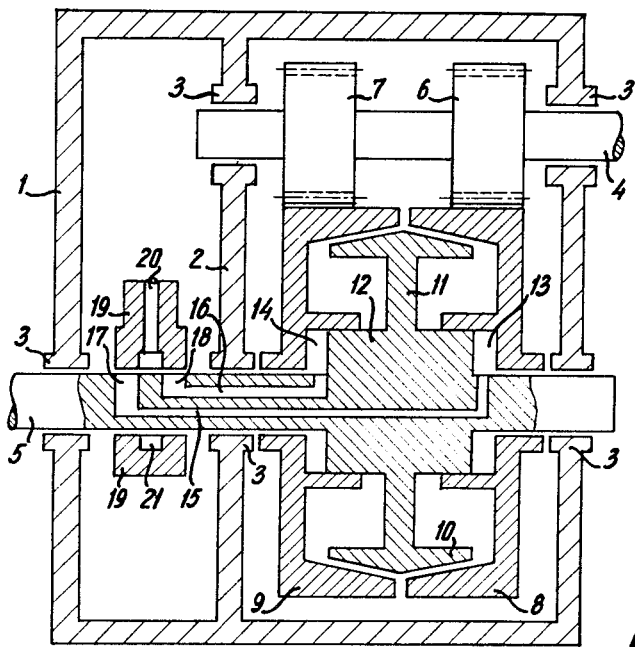

United States Patent [19]

Andersen

[11] 3,710,907
[45] Jan. 16, 1973

[54] REVERSING CLUTCHES WITH FOLLOW-UP VALVE

[75] Inventor: Eilif Andersen, Jyderup, Denmark

[73] Assignee: Motorfabriken Bukh A/G, Kalundborg, Denmark

[22] Filed: Dec. 30, 1971

[21] Appl. No.: 214,045

[30] Foreign Application Priority Data

Jan. 6, 1971 Denmark..................................41/71

[52] U.S. Cl. ..............192/87.17, 192/87.19, 192/86, 137/625.63
[51] Int. Cl..............................................F16d 25/10
[58] Field of Search........192/86, 87.17, 87.18, 87.19

[56] References Cited

UNITED STATES PATENTS

| 2,210,855 | 8/1940 | Halford | 192/87.19 |
| 2,600,043 | 6/1952 | Armitage et al. | 192/87.17 |

Primary Examiner—Benjamin W. Wyche
Attorney—William E. Schuyler, Jr. et al.

[57] ABSTRACT

A reversing gear, primarily for boat engines, comprising a pair of coaxial, counter-rotating drive elements, and a driven element accommodated in the space between said drive elements and mounted for axial displacement so as to be engaged with either of, and disengaged from, said drive elements. The driven element is carried by a plunger the end portions of which are received in cylinder chambers provided in said drive elements and communicating, via ducts in the drive shaft, with pressure fluid supply and drainage ports controlled by an axially displaceable slide valve so that a servo effect is obtained when the slide valve is displaced relative to the shaft which is thereby itself caused to move axially, together with the driven element, relative to the slide valve and the drive elements, respectively.

1 Claim, 3 Drawing Figures

PATENTED JAN 16 1973     3,710,907

REVERSING CLUTCHES WITH FOLLOW-UP VALVE

The invention relates to a hydraulically operated reversing gear intended particularly, but not exclusively, for boat engines and comprising two coaxial driving elements rotating in opposite directions, and an associated driven element that is connected to the driven shaft of the gear and is located between the driving elements so as to be brought into driving engagement with either of these driving elements by an axial displacement relative thereto.

It is an object of the invention to provide a particularly compact and sturdy design of such a reversing gear in which the displacement necessary for a reversal of the rotational movement of the driven shaft shall further be possible in a simple manner.

The reversing gear according to the invention is characterized in that the driving elements are secured against axial displacement and form a pair of cylinder chambers that are open where facing each other for accommodating the end portions of a plunger that is rigidly connected to the driven shaft and, on its central portion, carries the driven element and which is axially displaceable in conjunction with this element and the driven shaft that contains a pair of hydraulic fluid ducts each communicating with one of the cylinder chambers and having radial inlet and outlet ports lying outside the cylinder chambers and being spaced axially apart in a slide face for an annular slide valve, that surrounds the driven shaft and is displaceable in its axial direction so as to connect either of the ports to the hydraulic fluid pressure pipe while the other port is opened for drainage of fluid of the associated cylinder chamber.

For changing the rotation of the driven shaft, all what is needed is an axial displacement of the annular slide valve for controlling the flow of the hydraulic fluid to and from the two cylinder chambers. In its center position, the slide valve keeps both ports closed so that both cylinder chambers are under equal pressure which, in turn, has the effect of keeping the plunger and the driven element in a center position in which this element is out of engagement with the two driving elements. If the slide valve is displaced out of its center position, it will provide access for the hydraulic pressure fluid to one of the cylinder chambers while the other one is drained. This causes the plunger together with the driven element to be displaced in a corresponding manner so that the driven element is brought into engagement with one or the other of the driving elements. The driven shaft participates in this displacement and is thereby moved axially in relation to the slide valve, now stationary, so that the inlet and outlet ports are again closed or substantially closed by the slide valve.

Consequently it is possible to utilize the hydraulic pressure fluid not merely for displacing the plunger and the driven element that is rigidly connected thereto, but also for maintaining the plunger and, thereby, the driven element in the two extreme positions as well as in the center position.

The individual components of the gear may, without detriment to its function, be manufactured with relatively rough tolerances and the risk of an undesired locking or jamming of the gear in one or the other position can be regarded as precluded under normal conditions since the function does not depend on return springs which, as experience has shown, can be damaged in use.

Figure 2:
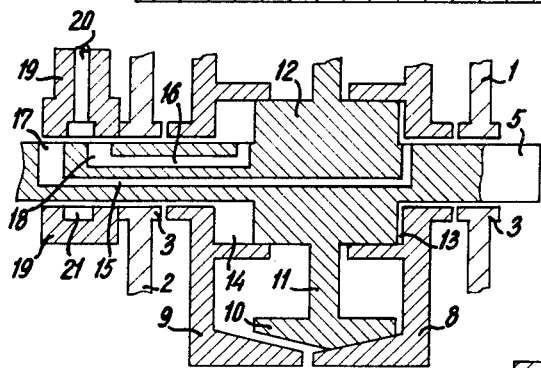
Figure 3:
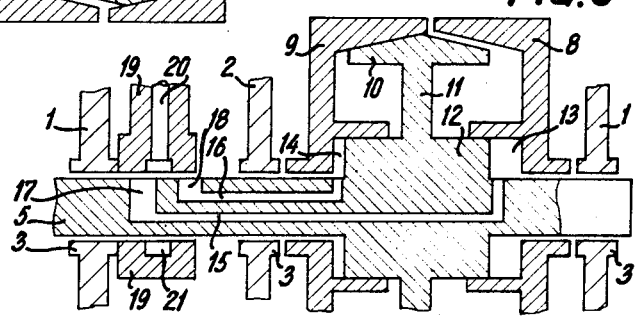

Further details and advantages of the reversing gear according to the invention will become apparent from the following description of an embodiment with reference to the accompanying drawing, in which FIG. 1 is a vertical longitudinal section through this embodiment of the reversing gear according to the invention with the driven element in its center position, that is to say disengaged from the driving elements, and FIGS. 2 and 3 partial sections similar to FIG. 1 with the driven element engaged with one or the other of the driving elements, respectively.

As illustrated, the reversing gear has a box-shaped casing 1 with a vertical partition 2 and with bearings 3 for a drive shaft 4 and a driven shaft 5. Fixed to the drive shaft 4 are two gear wheels 6 and 7 which are directly and by means of an intermediate gear wheel (not shown), respectively, each in engagement with one of two bowl-shaped friction drive elements 8 and 9 which, consequently, rotate in opposite directions. Driving elements 8 and 9 are supported in casing 1 in such a way that they cannot be axially displaced.

A corresponding driven friction element 10 is carried by a collar or flange 11 on the center part of a plunger 12 which is integral with the driven shaft 5 and which, with its end portions, is located inside cylinder chambers 13 and 14 formed by the bowl-shaped friction elements 8 and 9.

Shaft 5 contains longitudinal ducts 15 and 16 that connect cylinder chambers 13 and 14 with radial ports 17 and 18 which are axially spaced apart in a slide face surrounded by an annular slide valve 19 that is axially displaceable on shaft 5 and contains a hydraulic fluid pressure bore 20 terminating in an annular groove 21.

In FIG. 1, the gear is shown in its neutral position in which the plunger 12 and the slide valve 19 are in their respective center positions. Hereby, ports 17 and 18 are closed by the slide valve 19 and the driven element 10 is disengaged from both driving elements 8 and 9.

When it is desired to rotate the driven shaft 5 in the same direction as drive element 8, slide valve 19 is displaced laterally to the right, that is to say into the position illustrated in FIG. 2. Hereby, communication will be established from hydraulic fluid pressure pipe 20 to cylinder chamber 14 via port 18 and duct 16, while cylinder chamber 13 communicates with the draining orifice via duct 15 and port 17. Plunger 12 and, thereby, the driven element 10, will consequently be displaced to the right until element 10 comes into engagement with driving element 8 as shown in FIG. 2. However, the driven shaft 5 and, with it, ports 17 and 18, also participate in this displacement movement, so that they, in relation to slide valve 19, again approach the position in which both these ports are closed. This situation appears from FIG. 2, in which it is indicated, however, that the two ports are not completely closed so that the hydraulic fluid continues to have access to cylinder chamber 14 and is able to drain more or less freely from cylinder chamber 13.

Shifting the gear back into its neutral position is effected by a backward displacement of slide valve 19 into its center position. Then the pressure fluid will first be led to cylinder chamber 13 via port 17 and duct 5, while fluid is drained freely from cylinder chamber 14.

When plunger 12 has reach its center position during the displacement movement to the left, both ports 17 and 18 will be closed by slide valve 19 as shown in FIG. 1 and the gear will consequently remain in the neutral position.

Engaging and disengaging the driven element 10 with and from driving element 9 is effected in an analogous manner by a lateral displacement to the left of slide valve 19 from its center position shown in FIG. 1. This situation is illustrated in FIG. 3, where cylinder chamber 13 is under hydraulic fluid pressure, while cylinder chamber 14 is drained more or less freely via duct 16 and port 18.

I claim:

1. A hydraulically operated reversing gear, comprising a casing, a pair of counter-rotating, coaxial, and axially spaced driving elements which are held against axial displacement and each present a cylinder chamber having an open end towards the space between said elements, a driven shaft that is journalled for rotation and axial displacement in said casing, a plunger carried by said shaft and held against rotation and axial displacement relative thereto, said plunger having its end portions accommodated in the cylinder chambers of said driving elements, a driven element carried by said plunger between said end portions, and means for axially displacing said shaft with said plunger and driven element between two extreme positions in which said driven element is in torque transmitting engagement with one and the other, respectively, of said driving elements, said displacing means comprising an annular slide valve that surrounds a slide face on said driven shaft having a pair of axially spaced ports which through respective ducts in said shaft communicate with one and the other, respectively, of said cylinder chambers, said slide valve having connections for supply and drainage of hydraulic fluid and being axially displaceable on said slide face between two extreme positions in which a respective one of said ports communicates with the supply connection while the other port communicates with the drainage connection.

* * * * *